United States Patent [19]
Naumann et al.

[11] Patent Number: 4,624,854
[45] Date of Patent: Nov. 25, 1986

[54] CONTINUOUS METHOD OF STERILIZING FOODSTUFFS

[75] Inventors: Gerd Naumann, Langenhagen; Gerhard Syrbius, Grossburgwedel, both of Fed. Rep. of Germany

[73] Assignee: Hermann Berstorff Maschinenbau GmbH, Hanover, Fed. Rep. of Germany

[21] Appl. No.: 768,569

[22] Filed: Aug. 23, 1985

[30] Foreign Application Priority Data

Sep. 3, 1984 [DE] Fed. Rep. of Germany ....... 3432341

[51] Int. Cl.[4] .................. G01N 33/02; A23L 3/18; H05B 6/64
[52] U.S. Cl. .................. 426/233; 219/10.55 M; 426/241; 426/521
[58] Field of Search ............... 426/233, 241, 243, 521; 219/10.55 A, 10.55 M

[56] References Cited

U.S. PATENT DOCUMENTS

| | | | |
|---|---|---|---|
| 3,630,755 | 12/1971 | Schiffmann et al. | 426/241 |
| 3,961,569 | 6/1976 | Kenyon et al. | 219/10.55 A |
| 4,198,554 | 4/1980 | Wayne | 219/10.55 A |
| 4,444,723 | 4/1984 | Matsumaru et al. | 219/10.55 A |

*Primary Examiner*—George Yeung
*Attorney, Agent, or Firm*—Schwartz, Jeffery, Schwaab, Mack, Blumenthal & Evans

[57] ABSTRACT

A method of continuously sterilizing foodstuff and an apparatus suitable for carrying out the method are disclosed. The invention, which permits a considerable saving in the amount of microwave energy to be achieved, is attained by providing a plurality of sequential stages in each of which the foodstuff is subjected to microwave radiation, the temperature of the article being sterilized being monitored in each stage and the amount of microwave energy being reduced from stage to stage in a stepwise manner in dependence upon the temperatures monitored.

3 Claims, 2 Drawing Figures

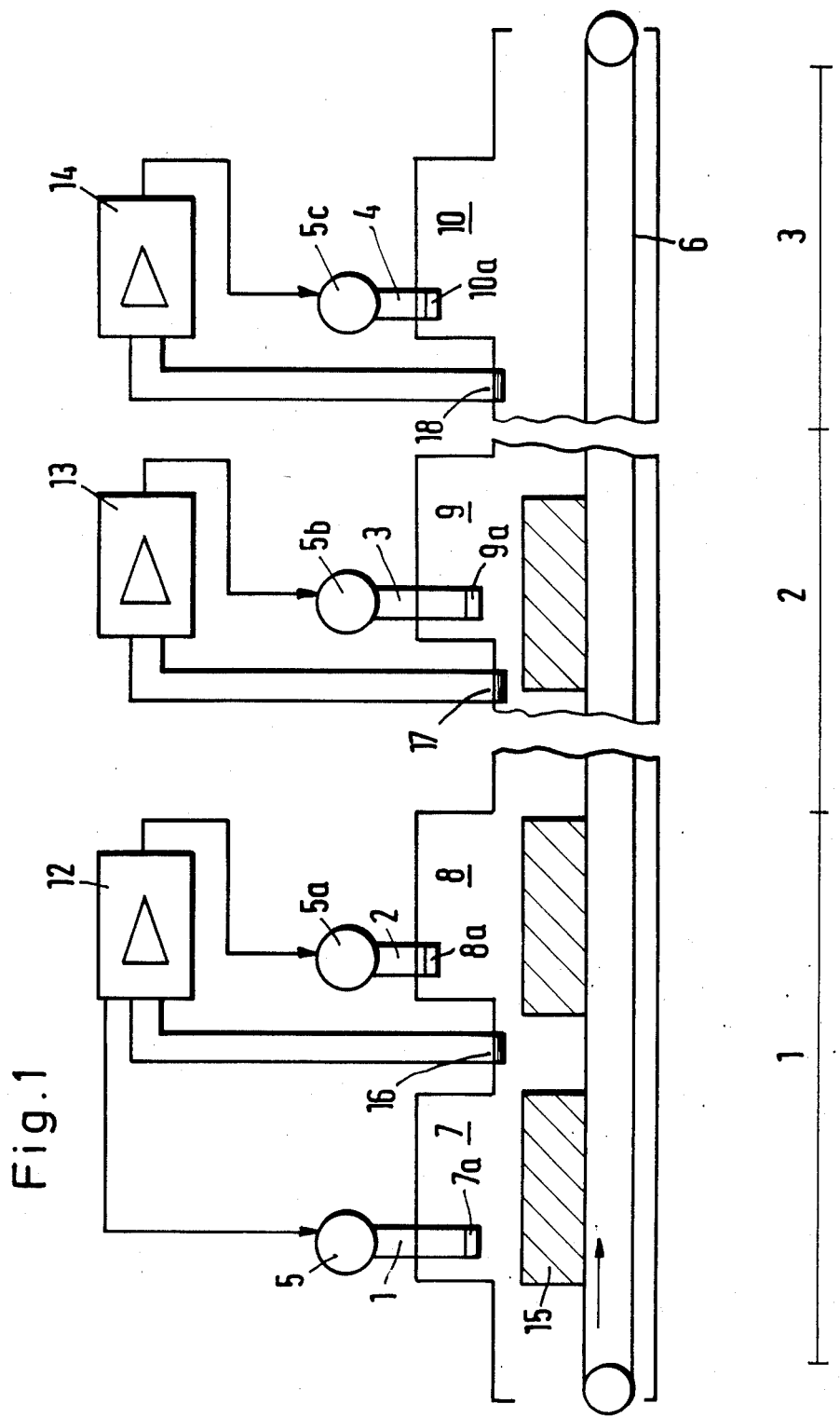

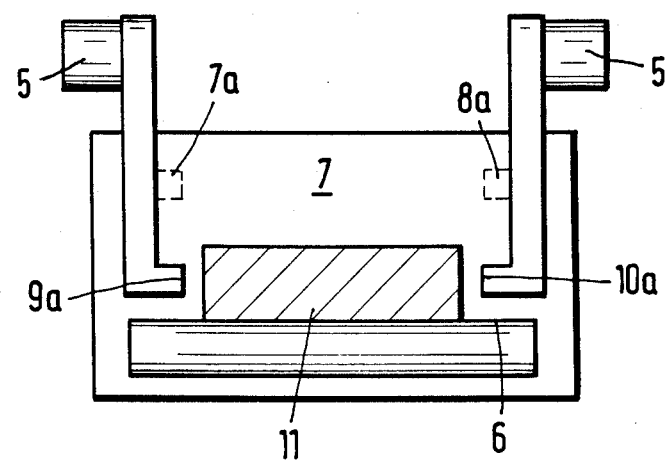

CONTINUOUS METHOD OF STERILIZING FOODSTUFFS

FIELD OF THE INVENTION

The present invention relates to a continuous method of sterilizing foodstuffs utilising microwave energy in which the foodstuffs are located on an endless conveyor belt. The belt is guided sequentially through a plurality of microwave chambers. The present invention also relates to an apparatus suitable for carrying out such a method.

BACKGROUND OF THE INVENTION AND PRIOR ART DISCUSSION

In German Auslegeschrift No. 1 184 877, there is disclosed a cooking apparatus suitable for domestic use or for small catering businesses. Such apparatus comprises a radiation-free defrosting or pre-heating chamber and a microwave radiation chamber. These individual chambers have separate tasks to perform and are, to all intents and purposes, independent of one another.

OBJECTS OF THE INVENTION

The present invention seeks to provide a continuous method for carrying out a sterilization process using microwave energy in which the amount of energy supplied and used is optimized whilst at the same time preventing focal-point, thermal overloading of the foodstuff being sterilized.

SUMMARY OF THE INVENTION

According to the present invention, there is provided a continuous method of sterilizing foodstuffs utilizing microwave energy in which the foodstuff to be sterilized is located on an endless conveyor belt and is sequentially conveyed through a plurality of microwave treatment stages, each stage comprising at least one microwave treatment chamber wherein the temperature of the foodstuff to be sterilized is measured in each stage, the supply of microwave energy being reduced, in a stepwise manner, from stage to stage, in dependence upon the temperature measurements which are obtained.

Preferably, three microwave treatment stages are provided, the first stage is supplied with an amount of microwave energy to generate a temperature of 40° C. to 50° C. in the foodstuff being sterilized, the second stage being supplied with substantially 40% of the amount of energy supplied to the first stage, and the third stage being supplied with substantially 30% of the amount of energy supplied to the first stage.

Alternatively or additionally, three microwave treatment stages are provided, wherein the microwave energy supplied to the first stage generates a temperature of between 40° C. to 50° C. in the foodstuff being sterilized, the microwave energy supplied to the second stage generates a temperature of substantially 70° C. in the foodstuff and the microwave energy supplied to the third stage generates a temperature of substantially 80° C. in the foodstuff.

Also in accordance with the present invention, there is provided an apparatus for carrying out a continuous method of sterilizing foodstuffs comprising a plurality of microwave treatment stages which are disposed sequentially, each stage comprising at least one microwave treatment chamber, an endless conveyor belt passing through all of the chambers and which accommodates the foodstuff to be sterilized, each stage having a temperature measurement device associated therewith for measuring the temperature generated by the microwave radiation in the foodstuff, each temperature measurement device having a control device operatively connected thereto, each chamber having a microwave generator communicating therewith, said control device for each said stage being operatively connected to each said generator in that stage for controlling the amount of microwave radiation supplied to each chamber in the stage.

Preferably, each microwave chamber is provided with an inlet aperture for the microwave radiation, the inlet apertures being offset from one another from chamber to chamber and being disposed on the internal periphery of the chamber, a microwave generator being connected to each inlet aperture.

By reducing the amount of microwave energy supplied to the foodstuffs to be sterilized in a stepwise manner, the energy is used in a highly efficient, and therefore economic, manner, without the problems of focal-point overheating phenomena arising.

In the method of the present invention, the temperature of the foodstuff is measured in a contactless manner in each stage, and the supply of microwave energy to each of the stages is modified accordingly. It can be ensured that the microwave energy supplied is reduced from stage to stage so that, once the appropriate sterilization temperature for the particular foodstuff has been reached, it is never exceeded in a subsequent stage.

For example, a sterilization temperature of 80° C. should not be exceeded when sterilizing wrapped sliced bread. Accordingly, microwave energy may be supplied in the first stage until the bread reaches a temperature of between 40° C. and 50° C.

If, as is the case in all prior art arrangements known to the present applicants, microwave energy continues to be supplied in subsequent stages at the same level, the temperature in the article to be sterilized would increase so sharply that focal-point thermal damage would be sustained by the foodstuff. This problem had already been noted and efforts have been made to overcome it by slowing the rate of temperature rise in the foodstuff. However, since known apparatuses have only a single microwave treatment stage, it proved necessary to use a very long radiation chamber so that the temperature of the article to be sterilized was raised very slowly to prevent overheating.

As a result, a larger amount of microwave energy needed to be produced than was hitherto the case. This proved expensive per se, and also meant that the steilizing process took considerably longer to produce the desired results.

By reducing the supply of energy in a stepwise manner, the rate of increase in temperature in the foodstuff to be sterilized per unit time is retarded in the latter stages of the sterilization treatment. Moreover, the energy which has already been introduced into the article at relatively hot locations thereof can be evenly dissipated by heat conduction.

In consequence, a considerable amount of microwave energy can be saved whilst, at the same time, reducing the sterilization time. In particular, however, it must be emphasized that focal-point overheating of the product is effectively avoided. This is because of the reduction in the amount of energy supplied to the foodstuff. The amount of heat introduced into the foodstuff is no longer much greater than the amount of heat in the article which can be dissipated by heat conduction.

Furthermore, the disadvantages of water being present in the material, which causes more energy to be absorbed as the heating temperature increases, in other words, which causes hot spots in the article to become even hotter, is effectively eliminated by the method according to the invention due to the stepwise reduction in the energy supplied from stage to stage.

By providing a plurality of treatment stages, each of which comprises one or more chambers to form treatment stages and by providing each stage with its own temperature measurement location, such measurement locations being operatively connected to regulating devices which control the microwave generators, an apparatus is provided which is capable of carrying out the method of the present invention.

In such apparatus, a temperature empirically determined for the particular foodstuff being sterilized is achieved in the first stage. When such temperature has been reached, the amount of microwave energy supplied to the subsequent stages is regulated accordingly, the dwell or sterilization time being of fundamental importance. However, such time can be reduced in importance, it can be lengthened or shortened relatively easily, in dependence upon the foodstuff being sterilized, by modifying the speed of the conveyor belt in dependence upon the desired temperature control in the individual stages.

If such a method and apparatus only brings about a bacterial reduction of the order of ten times, the durability or life of the foodstuff is increased considerably. Accordingly, the method and apparatus of the present invention have considerable economic significance.

In the apparatus which is illustrated hereinafter, each stage may comprise one or more microwave chambers. If the number of chambers in each stage is increased, it is generally true to say that the amount of energy supplied can be more accurately controlled and that the control of the temperature in each stage is facilitated.

Moreover, the more chambers that are provided in each stage, the higher can be the speed of the endless conveyor belt for the article to be sterilized. Since a single belt is guided through all of the chambers, which chambers are disposed sequentially, it will be readily apparent that by increasing the speed of the conveyor belt, the throughput of the apparatus is increased and the apparatus therefore operates more economically.

BRIEF DESCRIPTION OF THE DRAWINGS

One embodiment of a microwave apparatus in accordance with the present invention will be further described, by way of example, with reference to the accompanying drawings, in which:

FIG. 1 is a schematic longitudinal sectional view through a microwave apparatus shown schematically.

FIG. 2 is a cross-sectional view through the apparatus of FIG. 1.

DESCRIPTION OF PREFERRED EMBODIMENT

In the drawings, there is shown an endless conveyor belt 6 which is disposed in a hollow conductor or guide of a microwave apparatus. The belt 6 is utilized for the conveyance of foodstuffs 15 to be sterilized. The foodstuffs 15 may be wrapped slices or loaves of bread.

The upper run of the belt 6 is utilized to carry the foodstuffs 15 through three sequential microwave treatment stages identified, at the bottom of FIG. 1 by the reference numerals 1, 2 and 3. The first of these stages 1 comprises two microwave treatment chambers 7 and 8, the second stage comprises a microwave treatment chamber 9 and the third stage comprises a microwave treatment chamber 10.

The chambers 7, 8, 9 and 10 are each provided with a microwave generator 5, 5a, 5b and 5c respectively. From the generators 5, 5a, 5b and 5c, the microwaves pass along conduits 1, 2, 3 and 4 respectively and enter their respective chambers 7, 8, 9, 10 through inlet apertures 7a, 8a, 9a and 10a respectively.

As the article 15 to be sterilized passes through the sterilizing apparatus, its temperature in stage 1 is contactlessly measured by means of a temperature measuring device 16. The values thus obtained are transmitted to a control device 12 which is connected to the microwave generators 5 and 5a. In dependence upon the values thus obtained, the amount of microwave energy supplied to the chambers 7 and 8 is controlled by the control device.

By controlling the amount of microwave energy generated by the generators 5 and 5a and which is fed into chambers 7 and 8 through the conduits 1 and 2, it can be ensured that a specific pre-determined temperature can be maintained in the article 15 to be sterilized.

Similarly, in stages 2 and 3, temperature measuring devices 17 and 18 are provided. These are connected, respectivley, to control devices 13 and 14. These measuring devices contactlessly determine the temperature of the article in stage 2 and 3.

To prevent the development of focal-point thermal overloadings in the article and to employ as little microwave energy as possible for the sterilizing process, the supply of microwave energy to each of the stages 2 and 3 is controlled by the control devices 13 and 14 to ensure that the appropriate sterilization temperature in that stage is maintained. This permits the rise in temperature per unit time to be retarded which also permits the amount of energy to be reduced. The temperature in the article in any particular stage is suitably controlled and overheating phenomena, which give rise to thermal damage of the product, are eliminated or at least minimized.

It is also possible to influence the degree of sterilization of the foodstuffs by adjusting the speed of the conveyor belt 6 in dependence upon the temperature values determined in the individual stages 1, 2 and 3.

As can be seen in FIG. 2, the inlet apertures 7a, 8a, 9a and 10a for the microwave radiation are not disposed at substantially identical locations within their respective chambers 7, 8, 9 and 10. Instead, these apertures are disposed adjacent the periphery of the chambers at different locations. This ensures that sterilization is effected throughout the product and also assists in reducing the possibility of focal-point thermal overloading of the foodstuff being treated.

We claim:

1. A continuous method of sterilizing foodstuffs utilizing microwave energy comprising the steps of locating the foodstuff to be sterilized on an endless conveyor belt, sequentially conveying said foodstuff on said belt throuh a plurality of microwave treatment stages, each said stage comprising at least one microwave treatment chamber, supplying microwave energy to each said treatment chamber to sterilize said foodstuff, monitoring the temperature of said foodstuff in each said stage, and reducing the amount of microwave energy supplied, in a stepwise manner, from stage to stage, in dependence upon the monitored temperature in each stage.

2. A method as recited in claim 1, wherein said foodstuff is conveyed sequentially through three microwave treatment stages, said first stage being supplied with an amount of microwave energy sufficient to generate a temperature of about 40° C. to about 50° C. in said foodstuff, said second stage being supplied with about 40% of the amount of microwave energy supplied to said first stage, and said third stage being supplied with about 30% of the amount of the microwave energy supplied to said first stage.

3. A method as recited in claim 1 wherein said foodstuff is conveyed sequentially through three microwave treatment stages, wherein said microwave energy supplied to said first stage generates a temperature of between about 40° C. to about 50° C. in said foodstuff, said microwave energy supplied to said second stage generates a temperature of about 70° C. in said foodstuff, and said microwave energy suplied to said third stage generates a temperature of about 80° C. in said foodstuff.

* * * * *